UNITED STATES PATENT OFFICE 2,469,370

PROCESS OF PRODUCING UNSATURATED PRODUCTS

Ivor M. Colbeth, Maplewood, N. J., assignor to The Baker Castor Oil Company, Jersey City, N. J., a corporation of New Jersey No Drawing. Application March 6, 1946, Serial No. 652,491

15 Claims. (Cl. 260—405.5)

This invention relates to treatment of higher fatty acid esters of monohydric and dihydric alcohols in such a way that products result therefrom that have a higher degree of unsaturation than the esters from which they were made. Such products are particularly useful in the production of resins, varnishes, and other drying products, as they aid in the formation and plasticization of films which solidify by the process of oxidation and/or polymerization.

This is a continuation-in-part of my now abandoned application Serial No. 434,093, filed March 10, 1942. Reference is also made to my Patents Nos. 2,278,425, 2,317,361 and 2,317,362.

The products formed hereby are usually viscous liquids having drying properties. They are pale in color and will dissolve in the usual organic solvents that are used in the paint industry, such as turpentine, solvent naphtha, ethyl acetate, gasoline, etc. They are valuable, for example, for replacing other materials such as linseed oil acids, China-wood oil acids, and, to a certain extent, linseed oil and China-wood oil.

The substances made in accordance with the present invention do not have the same strong drying properties as similar substances prepared from glycerides, but they are of distinct value in that they are valuable plasticizers for resins that are used in varnishes and lacquers, and for the more rapid drying oils.

One of the advantages of using the process of the present invention in forming the unsaturated ester-type plasticizers is that the resulting products have greater resistance to darkening or discoloration and greater resistance to alkali than products formed by previously known processes. A large part of this superiority is due to the fact that conjugated double bonds are formed in the ester molecules during the treatment of the initial esters according to the process of this invention.

The products of this invention may be used in the synthesis of alkyds in much the same manner that glycerides are so employed. They will combine with oxygen as do the drying oils. They may be caused to polymerize in a reasonably short length of time in the presence of catalysts, such as boron trifluoride, zinc chloride, and naphthalene sulfonic acid.

In carrying out this invention, fatty acids are esterified in the known way with a monohydric or dihydric alcohol, such as butyl alcohol, benzyl alcohol, or ethylene glycol. The fatty acids to be used may, for example, be obtained by the hydrolysis of naturally occurring animal or vegetable oils, or by the oxidation of long chain paraffin hydrocarbons. Those esters, formed from such fatty acids, which are not esters of saturated polyhydroxy or unsaturated mono- or poly-hydroxy acids are converted into such esters, as by oxidation, before being treated according to the process of this invention. In effect, then, the esters which are treated by this invention are the esters of such fatty acids as ricinoleic acid, dihydroxy oleic acid, and aleuritic acid which is a trihydroxy palmitic acid.

Various methods may be used for oxidizing the esters of the acids which do not contain the desired number of hydroxyl groups. This oxidation, and the resulting introduction of hydroxyl groups into the fatty acid chains, may be accomplished by the use of air, oxygen, or ozone. Or such oxidizing agents as chlorine, iodine, etc., may be used in the oxidizing step and the hydroxyl groups may then be formed by treatment with alkalis, such as aqueous sodium hydroxide. Oxidizing agents such as potassium permanganate in dilute alkali solution may be used when desired. More than one oxidizing agent may be used for the introduction of hydroxyl groups into the ester molecules. These agents may be used in sequence. For example, the ester may be treated with a dilute alkaline solution of potassium permanganate whereupon hydroxyl groups become attached to the fatty acid chains at the positions previously occupied by the double bonds. Additional hydroxyl groups can then be introduced by chlorination of this hydroxy compound, after which the chlorine groups are transformed into hydroxyl groups through the medium of an aqueous alkali. As an alternative to the treatment with potassium permanganate, unsaturated esters may also be treated with anhydrous hydrogen chloride; further chlorine atoms are then introduced by chlorination, and the hydroxylation step is carried out as before.

In carrying out this invention esters of monohydric or dihydric alcohols and hydroxy acids of the sorts mentioned above are treated with a boron compound to form soluble ester-type plasticizers with some drying properties. The reaction with the boron compound serves to remove the hydroxyl groups from the fatty acid chains in the ester molecules, thereby yielding esters of fatty acids having at least two double bonds per fatty acid chain. The reaction of the hydroxy ester with the boron compound is carried out at a suitable temperature in the range from about 180° to about 260° C. Ester linkages are formed between the boron compound and the hydroxyl groups of the hydroxy esters in this reaction. Following the completion of this reaction, the reaction mixture is heated to a somewhat higher temperature in the range from about 190° to about 300° C. in order to bring about the decomposition of the initially formed boron-containing esters and produce unsaturated esters so that no hydroxyl groups will be attached to the fatty acid chains.

A mixture of the hydroxy ester and the boron compound may be heated slowly to the initial reaction temperature, or the hydroxy ester may be heated to the reaction temperature and the boron compound added in small increments. The amount of boron compound used in this process is usually from about 0.1 to about 4.0%, based on the amount of the hydroxy ester. Physical test methods, such as the determination of the refractive index, may be utilized in checking the completeness of the dehydroxylation reaction in any given instance; but, in general, the reaction is continued until the acetyl value of the product is at least less than 10. The reaction may even be carried to the point where the acetyl value is practically zero. It is preferred to carry out this reaction with a boron compound and the subsequent decomposition reaction in an atmosphere free from oxygen. Such an atmosphere may be attained by evacuating the reaction system, or by maintaining an inert gas in this system.

The products of this invention are quite pale in color. The acid value of the products can be maintained below about 5 by proper regulation of the temperature and the vacuum. The acid value generally ranges from less than 1 to about 2. The viscosity of the final products can be controlled by the length of time of treatment with the boron compound and the temperature at which the reactions are carried out.

Various boron compounds, such as boric acid, boric anhydride, borax, and boron pyrosulfate, may be used in the process of this invention. It has been found that, since boric acid is difficultly soluble in water and also since it is desirable to introduce it into the hydroxy ester in such a way that it does not become occluded in masses of solidified ester, thus preventing its complete reaction with the ester, borax can first be dissolved in water and then decomposed with mineral acids and the entire solution gradually fed into the reacting vessel containing the hot ester. The rapid evaporation of the solution produces microscopic crystals of boric acid which are more readily dissolved by the ester and also facilitates better control of the reaction.

In general, the greater the amount of boron reagent used, the darker is the color of the resulting products, the lower the temperature of the reaction, the lighter is the color of the resulting products; and the shorter the time of the reaction, the lighter is the color of the resulting products. The use of boron pyrosulfate as the boron reagent brings about improved reaction conditions in all three of these conditions.

The boron pyrosulfate may be ground and added to the ester as a powder, but better results are obtained if the ester is heated to reaction temperature and a mixture of borax or boric acid or boric anhydride and sulfuric acid in the proper proportions to form the boron pyrosulfate is introduced into the ester. The time of reaction is decreased approximately $\frac{1}{10}$ when the ester is treated with only about 0.1 to 0.25% of the boric and sulfuric acid compound or boron pyrosulfate as compared to the time required when the boric acid is used alone. It has been found, moreover, that the extent of conversion of the hydroxy esters to unsaturated compounds is very much more complete than is the case with other catalysts. This is indicated by the lower acetyl values which may be obtained readily by the use of boron pyrosulfate as the catalyst. Since, when boron pyrosulfate is used, the reaction may be conducted at a relatively low temperature, very little hydrolysis of the ester takes place, and the acid value of the finished ester is but slightly higher than that of the original hydroxy ester.

By preparing boron derivatives of hydroxy esters by adding any compound of boron which will react with the hydroxyl groups, such as metallic borates, boric acid, boric anhydride, halides of boron, sulfates, acetates, and other organic compounds of boron, and then adding to the resulting product from 0.1 to 0.25% of sulfuric acid, products are formed similar to those described above. The sulfuric acid causes the boron derivatives of the hydroxy esters to be decomposed with the elimination of water, and unsaturated esters of lower viscosity, higher refractive index, lighter color, and lower acid value than is possible without the use of boron pyrosulfate, are thus produced. It has been found that when the amount of borax is increased to twice the theoretical amount required for the preparation of the sodium boryl pyrosulfate, the resulting products appear to be as advantageous as the sodium boryl pyrosulfate and they have the additional advantage of keeping the acid value of the unsaturated esters at a minimum.

The following examples are given to illustrate the invention, but it is to be understood that the invention is not limited to these examples.

*Example 1*

Ricinoleic acid is esterified with butyl alcohol using 0.5% of sulfuric acid as a catalyst. When the esterification is complete, the sulfuric acid is removed by treating the reaction mixture with precipitated chalk; the excess butyl alcohol is removed by distillation; and the ester is freed from the chalk by filtration. The ester so prepared is then mixed with about 1.0%, based on the ester, of boryl pyrosulfate, $BOHS_2O_7$, and this mixture is heated to and maintained at approximately 225° C. After a short time, the temperature is increased to approximately 250° C., and the reaction mixture is kept at this temperature until the reaction is substantially complete. This is indicated when the acetyl value of the butyl ester falls below about 10. During the heating period, an atmosphere of nitrogen is maintained over the reaction mixture, so that substantially no oxidation of the unsaturated butyl ester will occur. The product resulting from this treatment is highly unsaturated, the iodine number having increased to about 140 to 150.

*Example 2*

Commercial red oil, which is a mixture of oleic and iso-oleic acids, together with other acids, is esterified with ethyl alcohol, using sulfuric acid as a catalyst, as described in Example 1. The esterified acid is distilled under vacuum to remove the impurities which cause dark color. The ester is hydrolyzed in the usual manner, and the resulting purified acid is then treated in an absorption tower by bubbling dry chlorine gas through the acid until the acid contains 2 to 3% of combined chlorine. The chlorinated product is then hydrolyzed by heating it with dilute alkali, whereupon the chlorine is removed and is very largely replaced by hydroxyl groups. The resulting product is then esterified by treatment with ethyl alcohol.

The resulting ethyl ester of hydroxy oleic acid is heated to about 210° C., and a mixture of boric anhydride and sulfuric acid in the proper proportions to form boryl pyrosulfate is introduced into the ester. Sufficient of the boric anhydride-sulfuric acid mixture is used so that the ester contains about 0.25% of boryl pyrosulfate. After a short time, the temperature is increased to about 235° C., and maintained at this point until the acetyl value of the ester is approximately 5. The reaction mixture is maintained in contact with a nitrogen atmosphere while the reaction is in progress.

The highly unsaturated ester formed in this treatment may be used in the preparation of alkyd resins. It is also eminently satisfactory for use as a plasticizer for a variety of plastic materials, including cellulose ethers and esters, natural and synthetic resinous materials, and synthetic rubbers.

*Example 3*

9,10-dihydroxystearic acid, obtained by oxidizing elaidic acid with hydrogen peroxide in acetic acid, is esterified with benzyl alcohol using sulfuric acid as a catalyst. The ester is heated to about 230° C., in a nitrogen atmosphere, and a solution obtained by dissolving borax in water and then decomposing the borax with a mineral acid, is gradually added to the hot ester. Approximately 2 to 3% of boric acid, based on the ester, is added in this way. After a short time, the temperature is increased to about 260° C., and kept at that temperature until the acetyl value of the ester indicates that the dehydration reaction is complete. A highly unsaturated ester which is a valuable plasticizer is obtained as a result of this treatment.

*Example 4*

The di-ester of ethylene glycol and 3,12-dihydroxy palmitic acid is heated to about 240° C. From about 3 to 4% of boric anhydride, based on the ester, is added in small increments to the heated ester. After a short time, the reaction mixture is heated to about 275° C. and maintained at this temperature until the dehydration reaction is completed. Oxidation of the heated ester is prevented by maintaining the reaction system under a reduced pressure. The unsaturated ester resulting from this treatment is an excellent plasticizer for a variety of plastic materials.

*Example 5*

Hydroxy acids obtained by the oxidation of long chain hydrocarbons, such as those obtainable from petroleum or by synthetic methods, e. g., the Fischer-Tropsch synthesis, are esterified with 2,3-butylene glycol. The resulting ester is mixed with about 0.5% of boryl pyrosulfate, and the mixture is heated to about 215° C. under a reduced pressure. The temperature is subsequently raised to about 235° C., and held at this point until dehydration of the ester is substantially complete. The resulting unsaturated ester has valuable softening and plasticizing properties for plastic materials.

*Example 6*

The butyl ester of aleuritic acid is heated with about 0.35% of boryl pyrosulfate to a temperature of about 200° C. Subsequently, the temperature is raised to approximately 225° C., and maintained at this point until dehydration of the butyl ester is substantially complete. The reaction mixture is blanketed with nitrogen during the heating period. The highly unsaturated ester which is formed is a valuable constituent of resins and varnishes.

*Example 7*

The heptyl ester of di-hydroxy oleic acid is subjected to a treatment corresponding to that of Example 6. The product obtained is a useful, unsaturated ester-type plasticizer.

I claim:
1. The process which comprises reacting an ester of a monobasic, hydroxy fatty acid and of a straight chain alcohol, said alcohol having not more than two hydroxyl groups per molecule and having a boiling point not higher than about 205° C., with a boron compound chosen from the group consisting of boric acid, boric anhydride, metallic borates, and the sulfate, pyrosulfate, halides, and acetate of boron to increase the unsaturation of the ester and to produce a pale viscous product, said reaction between said ester and said boron compound being effected by heating the reaction mixture to at least 180° C. and to not more than 260° C. until the boron esters are formed, and continuing the heating at an increased temperature in the range from 190° C. to 300° C. until the dehydration reaction is substantially complete.

2. The process of claim 1, in which said acid is ricinoleic acid.

3. The process of claim 1, in which said acid is dihydroxy oleic acid.

4. The process of claim 1, in which said alcohol is butyl alcohol.

5. The process of claim 1, in which said alcohol is ethylene glycol.

6. The process of claim 1, in which said boron compound is boric acid.

7. The process of claim 1, in which said boron compound is boron pyrosulfate.

8. The process of claim 1, in which said fatty acid is a dihydroxy stearic acid.

9. The process of claim 1, in which the amount of said boron compound used is 0.1-4.0%, based on the amount of ester.

10. The process of claim 1, in which said reaction is carried out at a sub-atmospheric pressure.

11. The process of claim 1, in which said reaction is carried out in the presence of an inert gas.

12. The process of claim 1, in which said reaction is continued until the acetyl value of the product is less than 10.

13. The process of claim 1, in which the reaction between said ester and said boron compound is effected by initially heating the reaction mixture to at least 200° C. and by subsequently raising the temperature to not more than 275° C. until the dehydration reaction is substantially complete.

14. The process which comprises reacting an ester of a monobasic, hydroxy fatty acid and of a straight chain alcohol, said alcohol having not more than two hydroxyl groups per molecule and having a boiling point not higher than about 205° C., with boron pyrosulfate to increase the unsaturation of the ester and produce a pale viscous product, said boron pyrosulfate being formed in situ in the ester by the treatment of a compound of boron with sulfuric acid, said compound of boron being one which will react with hydroxyl groups, and said reaction between said ester and said boron pyrosulfate being effected by heating the reaction mixture to at least 210° C. and to not more than 230° C. until a boron ester is formed, and continuing heating the reaction mixture to at least 235° C. and to not more than 260° C. until the dehydration reaction is substantially complete.

15. The process of claim 14 in which said compound of boron is boric acid.

IVOR M. COLBETH.

REFERENCES CITED

The following references are of record in the file of this patent:

UNITED STATES PATENTS

| Number | Name | Date |
| --- | --- | --- |
| 2,125,544 | Colbeth | Aug. 2, 1938 |
| 2,278,426 | Colbeth | Apr. 7, 1942 |
| 2,278,427 | Colbeth | Apr. 7, 1942 |
| 2,317,361 | Colbeth | Apr. 27, 1943 |
| 2,317,362 | Colbeth | Apr. 27, 1943 |